(12) United States Patent  
Eglin (10) Patent No.: US 9,085,352 B2  
(45) Date of Patent: Jul. 21, 2015

(54) METHOD OF CONTROLLING THE WING FLAPS AND HORIZONTAL STABILIZER OF A HYBRID HELICOPTER

(71) Applicant: EUROCOPTER, Marignane, Cedex (FR)

(72) Inventor: Paul Eglin, Roquefort la Bedoule (FR)

(73) Assignee: Airbus Helicopters, Marignane Cedex (FR)

( * ) Notice: Subject to any disclaimer, the term of this patent is extended or adjusted under 35 U.S.C. 154(b) by 442 days.

(21) Appl. No.: 13/895,782

(22) Filed: May 16, 2013

(65) Prior Publication Data

US 2014/0084106 A1 Mar. 27, 2014

(30) Foreign Application Priority Data

May 21, 2012 (FR) ...................................... 12 01434

(51) Int. Cl.
| | |
|---|---|
| B64C 27/57 | (2006.01) |
| B64C 19/00 | (2006.01) |
| B64D 45/00 | (2006.01) |
| B64C 27/26 | (2006.01) |
| B64C 13/16 | (2006.01) |

(52) U.S. Cl.
CPC ................. *B64C 19/00* (2013.01); *B64C 13/16* (2013.01); *B64C 27/26* (2013.01); *B64C 27/57* (2013.01); *B64D 45/00* (2013.01); *Y02T 50/44* (2013.01)

(58) Field of Classification Search
USPC .......... 244/6, 7 A, 8, 12.3, 17.11, 17.13, 23 R
See application file for complete search history.

(56) References Cited

U.S. PATENT DOCUMENTS

| | | | |
|---|---|---|---|
| 6,885,917 B2 * | 4/2005 | Osder et al. ....................... | 701/3 |
| 8,052,094 B2 | 11/2011 | Roesch | |
| 8,113,460 B2 | 2/2012 | Roesch | |
| 2005/0151001 A1 | 7/2005 | Loper | |
| 2008/0237392 A1 | 10/2008 | Piasecki | |
| 2012/0153072 A1 | 6/2012 | Eglin | |
| 2013/0020429 A1 * | 1/2013 | Kroo ................................ | 244/6 |

FOREIGN PATENT DOCUMENTS

| | | |
|---|---|---|
| EP | 2383184 A1 | 11/2011 |
| FR | 2916419 A1 | 11/2008 |
| FR | 2916420 A1 | 11/2008 |
| FR | 2959205 A1 | 10/2011 |
| WO | 2005005250 A2 | 1/2005 |

OTHER PUBLICATIONS

Search Report and Written Opinion; Application No. FR 1201434; dated Feb. 15, 2013.

* cited by examiner

*Primary Examiner* — John Woodrow Eldred
(74) *Attorney, Agent, or Firm* — Brooks Kushman P.C.

(57) ABSTRACT

A method of controlling a high-speed rotary wing aircraft (1) comprising a fuselage (2), at least one main rotor (3), at least one variable-pitch propulsive propeller (4), at least two half-wings (11, 11') positioned on either side of said fuselage (2), at least one horizontal stabilizer (20) provided with a movable surface (21, 21'), and at least one power plant driving said main rotor (3) and said propulsive propeller (4) in rotation. Said method serves to adjust the lift of said half-wings (11, 11') and the lift of the horizontal stabilizer (20) so that said lift of said half-wings (11, 11') represents a predetermined percentage of the total lift of said aircraft (1) and so that the power consumed by said main rotor (3) is equal to a setpoint power during a stage of stabilized flight.

20 Claims, 3 Drawing Sheets

METHOD OF CONTROLLING THE WING FLAPS AND HORIZONTAL STABILIZER OF A HYBRID HELICOPTER

CROSS REFERENCE TO RELATED APPLICATIONS

This application claims priority to French patent application No. FR 12 01434 filed on May 21, 2012, the disclosure of which is incorporated in its entirety by reference herein.

BACKGROUND OF THE INVENTION (1) Field of the Invention

The present invention relates to the technical field of the flight mechanics of a rotary wing aircraft. It relates to a method of controlling such an aircraft during a stabilized stage of flight at high speed. It also relates to a control device for such an aircraft.

The method and the device are intended more particularly for hybrid helicopters, i.e. rotary wing aircraft fitted with auxiliary propulsion.

(2) Description of Related Art

A rotary wing aircraft conventionally comprises at least one main rotor, serving to provide the aircraft both with lift and with propulsion, a fuselage, and a power plant.

A hybrid helicopter also includes at least one propulsive propeller and a lift-providing surface, or more simply a "lift surface", generally made up both of two half-wings situated on either side of the fuselage and of a horizontal stabilizer positioned at one end of the aircraft.

By way of example, two variable-pitch propulsive propellers are positioned on either side of the fuselage, one on each of the half-wings.

In addition, each half-wing may be fitted with at least one movable flap enabling the lift of each half-wing to be modified. Likewise, the horizontal stabilizer includes at least one movable surface in order to modify the lift of the horizontal stabilizer. The movable surface may be constituted by an elevator surface or by the horizontal stabilizer as a whole.

The main function of the two half-wings is to contribute to providing the hybrid helicopter with lift while it is in flight and flying at a high forward speed, with the propulsive propeller(s) making it possible to reach such a speed. In contrast, it is possible to speak of flight at moderate speed for flights at forward speeds that are slower than that of a cruising flight.

When flying at high forward speed, the movable horizontal stabilizer or the elevator surface of the hybrid helicopter are equivalent to a trim compensator in an airplane. Pitching control of the hybrid helicopter is performed using the cyclic control of the main rotor, while the movable horizontal stabilizer (or its elevator surface) serves to adjust the pitching equilibrium point of the aircraft in application of various criteria such as the attitude of the aircraft, or indeed the bending moment of the mast of the main rotor. In such a configuration, the half-wings contribute to the total lift of the aircraft needed for keeping the aircraft in the air. Consequently, the main rotor provides part of the lift in a hybrid helicopter when flying with high-speed forward speed, and possibly also contributes to propelling it forwards.

It can thus be seen that piloting a hybrid helicopter during high-speed forward flight requires special controls in order to modify the lifts of the half-wings and of the horizontal stabilizer, and also the pitches of the propulsive propellers.

Consequently, during flight at a high forward speed the workload on the pilot is large and complex in order to be able to manage the specific controls of the hybrid helicopter in addition to the conventional controls of a rotary wing aircraft.

An object of the present invention is thus to provide a method of assisting the pilot in order to determine and adjust the lifts of the half-wings and of the horizontal stabilizer specific to such a hybrid helicopter during a stabilized stage of flight.

The term "stabilized stage of flight" is used to mean flight at high forward speed, and thus applies to hybrid helicopters when flying conditions are constant, i.e. when the main flight parameters are constant. This applies in particular to the vertical speed and to the path of the aircraft. Constant vertical speed may be obtained in particular by maintaining the attitude and/or the angle of incidence of the aircraft constant. In the special situation where the vertical speed is zero, the stabilized stage of flight takes place at constant altitude, and can then be referred to as "cruising" flight. A constant path corresponds to a path without the aircraft changing heading. During such a stabilized stage of flight, the forward speed is preferably also constant. Nevertheless, it may vary, but generally slowly. In the method of the invention, dynamic variations take place slowly, so the method is compatible with forward speed varying in such a manner.

Document US 2008/0237392 describes a hybrid helicopter using a control system for controlling all of the controls of the aircraft. The aircraft incorporates databases of optimized and predefined flight parameters for different flight conditions and different types of flight.

The pilot selects the type of flight that is to be performed, e.g. minimizing fuel consumption, minimizing vibration, or indeed maximizing forward speed. The control system determines flight conditions by using various sensors incorporated in the hybrid helicopter and then selects from the database various predefined settings for the various controls of the aircraft corresponding to such flight conditions.

The control system then communicates these predetermined settings to the autopilot which acts without intervention from the pilot to apply them to the various control members of the hybrid helicopter.

Document FR 2 959 205 describes a method of controlling and regulating the deflection angle of a horizontal stabilizer of a hybrid helicopter at a stabilized high speed of advance. The purpose of that adjustment of the deflection angle is to optimize the power consumed by the aircraft.

That method comprises three regulation loops. The first loop controls the attitude of the aircraft by means of the longitudinal cyclic pitch, and the second loop controls the forward speed of the aircraft by means of the pitch of the propulsive propellers. Those two loops ensure that the aircraft is stabilized in longitudinal attitude and in forward speed. Finally, the third loop optimizes the power of the aircraft by means of the deflection angle of the horizontal stabilizer while maintaining the longitudinal attitude and the forward speed constant.

Any variation in the deflection angle of the horizontal stabilizer modifies its lift. Consequently, since the longitudinal attitude of the aircraft is kept constant by the first regulation loop, such variation in the lift of the horizontal stabilizer serves to subject the fuselage to a pitching moment in a nose-down or a nose-up direction. It is then appropriate to act on the orientation of the main rotor so that it tends towards a "nose-up" attitude or a "nose-down" attitude as required in order to counter the effect of the pitching moment of the stabilizer.

When the main rotor tends towards a nose-down attitude, it provides propulsion, i.e. it contributes to making the aircraft advance, providing it is being driven in rotation by the power plant of the aircraft. In contrast, when the main rotor is tending towards a nose-up attitude, it is in autogyro mode, i.e. it is not driven in rotation by the power plant, but rather by the flow of air created by the aircraft moving forwards. Under such circumstances, the main rotor serves to generate only lift.

Consequently, modifying the angle of deflection of the horizontal stabilizer has an effect on the operation of the main rotor and in particular on the power it consumes.

Furthermore, document FR 2 916 420 describes a hybrid helicopter having at least one elevator surface on a horizontal stabilizer with a deflection angle that can be controlled as a function of the bending moment of the mast of the main rotor. In addition, the cyclic pitch control for the blades of the main rotor enables the longitudinal attitude of the hybrid helicopter to be controlled, and the lift of the wings of that hybrid helicopter may thus be set to some particular percentage of the total lift in cruising flight.

In addition, document WO 2005/005250 describes a hybrid helicopter in which the wings provide about 70% of the total lift during cruising flight.

Also known is document FR 2 916 419, which describes a hybrid helicopter in which the speed of rotation of the main rotor can be reduced in cruising flight. Controlling the longitudinal cyclic pitch of the blades of the main rotor then enables the drag of the fuselage of the hybrid helicopter to be reduced. In addition, that helicopter has at least one elevator surface on a horizontal stabilizer with a deflection angle that can be controlled in order to cancel the bending moment of the mast of the main rotor.

Also known is an autopilot device for a hybrid helicopter that enables the aerodynamic angle of incidence of the aircraft to be kept constant and equal to a reference angle of incidence while performing stabilized cruising flight. In order to maintain this angle of incidence constant, the autopilot acts on the collective pitch of the blades of the main rotor.

Likewise, that device makes it possible to maintain the longitudinal attitude of the aircraft about its pitching axis constant and equal to a reference attitude while performing stabilized cruising flight. Under such circumstances, the autopilot acts on the longitudinal cyclic pitch of the blades of the main rotor.

In addition, the device provides a display that may show the reference angle of incidence and the reference attitude. The pilot can then see on the display both the actual attitude and angle of incidence of the aircraft and, where appropriate the corresponding reference values.

BRIEF SUMMARY OF THE INVENTION

An object of the present invention is to provide a method of controlling a high-speed rotary wing aircraft that makes it possible simultaneously to control the lift of the half-wings and of the horizontal stabilizer during a stabilized stage of flight. According to the invention, such an aircraft comprises a fuselage, at least one main rotor having a plurality of blades, at least one variable-pitch propulsive propeller, at least one lift surface, and at least one power plant driving the main rotor and each propulsive propeller in rotation. The lift surface may comprise two half-wings positioned on either side of the fuselage together with at least one horizontal stabilizer positioned at one end of the aircraft and provided with at least one movable surface.

The method makes it possible to determine the total lift needed by the aircraft, and then to adjust the lift of the two half-wings so that the lift of the two half-wings represents a predetermined percentage of the total lift of the aircraft during a stabilized stage of flight. The lift of the two half-wings, which is equal to the sum of the lifts from each of the half-wings, is adjusted by acting on aerodynamic control means of the aircraft.

A stabilized stage of flight corresponds to flight relative to a path and a horizontal speed of the aircraft that are constant, with its vertical speed being constant, or indeed zero in the particular case of a level flight. Such a flight can be obtained in particular by the action of an autopilot present in the aircraft adjusting the longitudinal cyclic pitch and the collective cyclic pitch controls for the blades of the main rotor of the aircraft. The pitch of each propulsive propeller may also be adjusted by the autopilot.

However, complete stabilization of the aircraft during a stabilized stage of flight is not then ensured in optimum manner.

Firstly, in flight, the total lift of the aircraft varies, in particular as a function of the mass of the aircraft.

Furthermore, the density of the air surrounding the aircraft varies as a function of temperature and as a function of altitude, thereby affecting the lift adjustment of the aircraft.

Fuel consumption lightens the aircraft while it is in flight. Furthermore, during a mission, the aircraft may need to load and unload freight or passengers, and that has an impact on its mass.

The total lift of an aircraft counters its weight in order to maintain the aircraft in the air, where the weight of an aircraft is obtained by multiplying its mass by the acceleration due to terrestrial gravity. Below, the term "total lift" is used to mean the lift needed to balance the weight of the aircraft.

When the total lift of the aircraft exactly balances its weight, the aircraft flies with vertical acceleration that is zero, i.e. at a vertical speed that is constant. When its total lift is greater than its weight, the aircraft moves with positive vertical acceleration, i.e. its rate of climb increases. In contrast, when its total lift is less than its weight, the aircraft moves with negative vertical acceleration, i.e. its descent speed increases.

As a result, in order to maintain a stabilized stage of flight, the total lift of the aircraft must be adjusted continuously so as to adapt to variations in the weight of the aircraft and in the density of the air.

This total lift of the aircraft is constituted mainly by the lift from the main rotor so long as the speed of flight is moderate. In contrast, when flying at a high forward speed, lift is constituted essentially by the sum of the lift from the main rotor plus the lift from the half-wings. The fuselage of the aircraft and its horizontal stabilizer may also give a contribution to this total lift of the aircraft. Nevertheless, that is not taken into account herein since it is negligible for most aircraft.

While flying at high forward speed, the presence of the half-wings serves to reduce the contribution of the main rotor to the total lift of the aircraft. In addition, using at least one propulsive propeller makes it possible also to reduce the contribution of the main rotor to the propulsion of the aircraft. Consequently, the lift and the propulsion from the main rotor can both be reduced, and as a result it is also possible to reduce the aerodynamic drag of the main rotor.

The method of the invention is remarkable in that it enables the total lift of the aircraft to be determined and it enables the lift of the half-wings of the aircraft to be adjusted so that this lift of the half-wings is equal to a first predetermined percentage of the total lift of the aircraft.

The total lift of an aircraft opposes the weight of the aircraft so as to keep the aircraft in the air, this weight depending on the mass of the aircraft. It is possible to deduce the mass of the aircraft, e.g. by measuring the fuel consumption of the power plant of the aircraft by means of flow meters installed on the power plant. Such consumption measurements serve to determine the quantity, and thus the mass, of fuel that has been consumed. By deducting the consumed mass of fuel from the total mass of the aircraft on takeoff, it is thus possible to estimate the weight of the aircraft at all times.

This first predetermined percentage enables the way the total lift of the aircraft is shared between the lift of the main rotor and the lift of the half-wings to correspond to good operating conditions for the aircraft.

This sharing makes it possible in particular to optimize the lift to drag (L/D) ratio or finesse of the main rotor during a stabilized stage of flight. For example, this sharing may be such that the lift of the half-wings represents 40% of the total lift of the aircraft.

This method then makes it possible to adjust the lift of the two half-wings by acting on aerodynamic control means of the aircraft.

By way of example, this lift adjustment may be obtained by changing the aerodynamic angle of incidence, or more simply the "angle of incidence" of the half-wings of the aircraft. Such a change of angle of incidence may be obtained, for half-wings that are completely stationary, by changing the attitude of the aircraft. With the path followed by the aircraft remaining unchanged, a modification to the attitude of the aircraft and thus to its angle of incidence modifies the angle of incidence of the two half-wings. Under such circumstances, the aerodynamic control means of the aircraft thus enable the attitude of the aircraft to be modified.

It is also possible for the half-wings of the aircraft to be movable as a whole, e.g. in pivoting. The aerodynamic control means of the aircraft then enable the half-wings to be pivoted without changing the attitude of the aircraft, while nevertheless modifying the angle of incidence of said half-wings.

The aerodynamic control means of the aircraft preferably comprise, on each half-wing, at least one movable flap at the rear of a stationary lift surface and associated with at least one control system for operating each flap. Such operation corresponds to moving the flap, e.g. modifying the surface area of each flap and thus enabling the lift of each of the half-wings to be modified, while the angle of incidence of the half-wings remains constant. It is also possible to modify lift by pivoting each flap, with or without movement in translation.

Furthermore, the flaps of each of the half-wings may be operated in different manners as to obtain differences in lift between the two half-wings. This difference in lift between the two half-wings may serve for example to compensate for the effects of the main rotor, in particular in terms of roll movement.

The streams of air generated by the rotation of the main rotor affect the two half-wings placed on either side of the fuselage of the aircraft in different ways. These streams are turbulent and they travel from the front towards the rear over one half-wing and from the rear towards the front over the other half-wing. They thus create asymmetry in the angles of incidence between the two half-wings. A lift difference thus appears between the two half-wings and tends to cause the aircraft to roll.

In order to compensate for this difference in lift and thereby avoid causing the aircraft to roll, the pilot acts continuously on the lateral cyclic pitch of the blades of the main rotor. Advantageously, the method of the invention makes it possible to determine the lift difference between the half-wings. The method then makes it possible to operate each of the flaps, via their control systems, so as to adjust the lifts of the two half-wings and obtain this difference.

The pilot thus no longer needs to take charge of this compensation for the asymmetry in angle of incidence between the two half-wings that is generated by the main rotor.

Likewise, the method can adjust the lift of each half-wing, by operating each flap in independent manner via the flap control means so that the lateral cyclic pitch of the blades of the main rotor is equal to a setpoint lateral cyclic pitch. Under such circumstances, the difference in lift between the two half-wings as obtained in this way serves to comply with a target lateral attitude of the aircraft. The flaps of the half-wings are operated at low frequency so that the aircraft converges on this lateral attitude. The setpoint lateral cyclic pitch is determined by the method and may be a function of the forward speed of the aircraft and of the density of the air.

Furthermore, the method of the invention is used only during stabilized stages of flight. The forward speed of the aircraft must be greater than 50 knots (kts). Furthermore, the method must be deactivated during changes in the behavior of the aircraft, in particular when turning. For example, the method may be active solely when the roll angle of the aircraft is less than 10°. Finally, in order to avoid countering a maneuver being made by the pilot of the aircraft, the method is deactivated as soon as the pilot is detected as taking any action on the controls of the aircraft.

In one implementation, the lift of the half-wings is determined in particular as a function of the density $\rho$ of the air under the conditions of flight, of the weight of the aircraft, of the angle of incidence $\alpha_{fus}$ of the aircraft, of the surface area S and of a lift coefficient $C_z$ of the two half-wings, and also of the true air speed (TAS) of the aircraft relative to the surrounding air. The lift coefficients of the half-wings are a function of the angles of incidence $\alpha$ of the half-wings. Values for these lift coefficients covering all possible angles of incidence are established by wind-tunnel measurements, and they are contained in a table stored in a memory of the aircraft.

The lift of a wing is thus given by the following general formula:

$$Z_{wing} = \tfrac{1}{2} \times \rho \times TAS^2 \times S \times C_z$$

Also known is the formula given the angle of incidence of the aircraft:

$$\alpha_{fus} = \theta - \operatorname{Arcsin}(Vz/TAS)$$

where $\theta$ is the longitudinal attitude of the aircraft and $V_z$ is the vertical speed of the air relative to the aircraft.

The values for the longitudinal attitude of the aircraft and its speeds are obtained by sensors that are conventionally present on rotary wing aircraft. Likewise, the air density is determined by tables relating to standard atmospheric data.

Furthermore, the angles of incidence of the half-wings are affected by the main rotor that generates a stream of air sweeping over the two half-wings, thereby creating interaction angles of incidence between the main rotor and the two half-wings. The angle of incidence $\alpha$ of each half-wing then corresponds to the angle of incidence of the aircraft $\alpha_{fus}$ to which an interaction effect $\alpha_{interaction}$ is added, giving:

$$\alpha = \alpha_{fus} + \alpha_{interaction}$$

It should be observed that the effect of the interaction $\alpha_{interaction}$ also takes account of any angular offset between the fuselage and the two half-wings and also of the zero lift angle of said half-wings. As a result, $\alpha_{interaction}$ is an angle of incidence correction.

The effect of the interaction $\alpha_{interaction}$ can be quantified by flight tests or by wind-tunnel tests.

The method thus determines the lift of each of the two half-wings using the following formula:

$$Z_{wing} = \frac{1}{2} \times \rho \times TAS^2 \times S \times \overline{C}_z$$

where $\overline{C}_z$ is the mean lift coefficient of the half-wings for the angle of incidence:

$$\alpha = \alpha_{fus} + \alpha_{interaction}$$

Thereafter, the method adjusts this lift of the half-wings by acting on the aerodynamic control means until the lift corresponds to the predetermined first percentage of the total lift of the aircraft.

In a preferred implementation of the invention, the lift of the half-wings is adjusted as a function of the weight of the aircraft and on the basis of a value for the lift of the main rotor.

The aircraft has a main gearbox that is mechanically coupled directly with the main rotor in order to transmit the rotary motion from the power plant to the main rotor. A plurality of support bars connect the main gearbox to the fuselage of the aircraft.

The method of the invention determines the value for the lift of the main rotor from force measurements performed on the support bars of the main gearbox. A geometrical transposition rule suffices to determine the lift of the main rotor on the basis of the forces as measured in each of the support bars. The sum of the vertical components of those measured forces corresponds to the lift. Furthermore, the angles of inclination of the support bars are known with the longitudinal and transverse attitudes of the aircraft being obtained by sensors on board the aircraft. Any deformation of these support bars generated by the measured forces and also the effects of a damper system on those support bars are ignored.

The total lift of an aircraft is constituted mainly by the sum of the lift of the main rotor plus the lift of the half-wings during a stabilized stage of flight. In addition, according to the method, the lift of the half-wings is equal to a first predetermined percentage of the total lift of the aircraft.

Consequently, the lift of the main rotor is equal to a second predetermined percentage of the total lift of the aircraft, with the sum of the first predetermined percentage plus the second predetermined percentage being equal to 100%. For example, if the lift of the half-wings represents 40% of the total lift of the aircraft, the lift of the main rotor then represents 60% of the total lift.

After determining the value of the lift of the main rotor, the method then adjusts the lift of the half-wings by acting on the aerodynamic control means so that the value of the lift of the main rotor is equal to said second predetermined percentage of the total lift of the aircraft.

In another implementation of the invention, the method serves to determine and adjust the lift of the horizontal stabilizer by acting on the control means for operating the movable surface of the horizontal stabilizer so that the power consumed by the main rotor is equal to a setpoint power.

The power plant of the aircraft generally has at least one zone in which its operation is at an optimum, e.g. for minimizing fuel consumption or for obtaining maximum power. This zone generally corresponds at least to a level of power consumed by the main rotor, and that can be used as the setpoint power.

Tests under various conditions of flight have served to determine the variations in the power consumed by the main rotor as a function of the cyclic and collective pitches of the blades of the main rotor and also as a function of those conditions of flight. A setpoint power for the main rotor corresponds to a pair of setpoint values, one for the longitudinal cyclic pitch and another for the collective pitch, which values are a function of the conditions of flight of the aircraft, and in particular the forward speed of the aircraft and the density of the air.

Furthermore, as explained above, it is known that a variation in the lift of the horizontal stabilizer makes it possible to cause the main rotor to tend towards a nose-down or a nose-up position during a stabilized stage of flight, with the attitude (or angle of incidence) of the aircraft remaining constant. The longitudinal cyclic pitch is then modified to counter this effect of the horizontal stabilizer, while the characteristics of the stabilized stage of flight, such as the forward speed of the aircraft and its attitude, for example, remain constant.

Consequently, the method serves to adjust the lift of the horizontal stabilizer until the longitudinal cyclic pitch corresponds to said setpoint value for the longitudinal cyclic pitch. Likewise, in order to conserve these conditions of flight and reach the setpoint power, the collective pitch is modified until it reaches the setpoint value for the collective pitch. The lift of the horizontal stabilizer is adjusted by acting on the control means for each of the movable surface of the horizontal stabilizer.

The power consumed by the main rotor is then equal to the setpoint power, corresponding to the setpoint values for the longitudinal cyclic pitch and for the collective pitch.

Each movable surface of the stabilizer may be constituted by a movable elevator of the horizontal stabilizer. Preferably, the horizontal stabilizer has two elevators.

Under such conditions, tests have enabled an optimum configuration of the aircraft in a stabilized stage of flight to be determined so that the main rotor consumes power in the range 20% to 40% of the power the main rotor consumes in hovering flight.

In an implementation of the invention, the method can adjust the lift of the horizontal stabilizer in order to ensure that the longitudinal cyclic pitch of the blades of the main rotor is equal to a setpoint longitudinal cyclic pitch. Under such circumstances, it is not desired to reach an aircraft power level directly, but rather to comply with a target longitudinal attitude of the aircraft. The movable surfaces of the stabilizer are operated at low frequency so that the aircraft converges towards this target longitudinal attitude. The target longitudinal cyclic pitch may be a function of the forward speed of the aircraft and of the density of the air.

In a variant method of the invention, the lift of the horizontal stabilizer is adjusted as a function of the measured value of the power needed by the main rotor. Under such circumstances, two sensors serve to determine the main rotor power: a torque meter measuring the torque of the main rotor; while its frequency of rotation is obtained by conventional means. The lift of the horizontal stabilizer is then adjusted so that the power measured on the main rotor is equal to the setpoint power. The longitudinal cyclic pitch and the collective pitch are then adjusted to keep conditions of flight unchanged independently of the above-mentioned setpoint values for the cyclic pitch and for the collective pitch.

In another variant of the method, the bending moment of the mast of the main rotor is measured directly by a dedicated sensor. This bending moment serves to determine a longitudinal bending moment and a lateral bending moment of the mast of the main rotor.

The lift of the horizontal stabilizer, that enables the main rotor to tend towards a nose-down or a nose-up configuration, acts directly on the value of this longitudinal bending moment. The method makes it possible to adjust the lift of the horizontal stabilizer until the longitudinal bending moment is equal to a setpoint longitudinal bending moment. Under such circumstances, the horizontal stabilizer thus enables a stabilized stage of flight to be performed with a bending moment of the mast of the main rotor corresponding to said setpoint longitudinal bending moment, e.g. for the purpose of reducing longitudinal stresses on the mast of the main rotor. Once more, the longitudinal cyclic pitch and the collective pitch are adjusted in order to keep conditions of flight unchanged.

Likewise, the lateral bending moment of the mast of the main rotor may be adjusted by controlling the flaps of the two half-wings in different manners so as to obtain a difference in lift between the two half-wings. The different lifts of each half-wing make it possible to generate a roll moment capable of opposing the lateral bending moment. The method adjusts the lift of each half-wing until a lateral bending moment of the mast of the main rotor is equal to a setpoint lateral bending moment, e.g. for the purpose of reducing lateral stresses in the mast of the main rotor.

The lifts of these two half-wings are adjusted by acting on the control system for each flap. Once more, the longitudinal cyclic pitch and the collective pitch are adjusted so as to maintain conditions of flight unchanged.

The setpoint longitudinal and lateral bending moments are a function of the conditions of flight.

In another implementation of the method of the invention, values are determined simultaneously for the cyclic pitch and for the collective pitch of the blades of the main rotor, as are values for the lift of the horizontal stabilizer and the lift of the half-wings for a stabilized stage of flight.

It is known that controlling the collective and cyclic pitches and also the pitch of each propulsive propeller makes it possible to ensure a stabilized stage of flight.

A collective pitch value for the blades of the main rotor is determined so that the angle of incidence of the aircraft is equal to a setpoint angle of incidence, e.g. in order to ensure that the altitude of the aircraft is constant and equal to a setpoint altitude.

In addition, the cyclic pitch of the blades of the main rotor may be resolved into a longitudinal cyclic pitch and a lateral cyclic pitch. A value is then determined for the longitudinal cyclic pitch of the blades of the main rotor so that the longitudinal attitude of the aircraft is equal to a setpoint longitudinal attitude.

Likewise, a value is determined for the lateral cyclic pitch of the blades of the main rotor in order to ensure that the lateral attitude of the aircraft is equal to a setpoint lateral attitude.

During a stabilized stage of flight, the forward speed of the aircraft is constant. Under such circumstances, the pitch of the propulsive propeller is controlled, e.g. by a regulation loop in parallel and independently of the method of the invention. The forward speed may also be controlled manually, the method of the invention then adapting to such changes in the forward speed. This adaptation does not disturb the piloting of the aircraft, since dynamic variation takes place slowly in comparison with a fast system that might generate surging phenomena.

Nevertheless, complete stabilization of the aircraft is not ensured in optimum manner. The lift of the aircraft is shared between the main rotor and the two half-wings.

The lift of the half-wings is then determined so as to correspond to the first predetermined percentage of the total lift of the aircraft, and the lift of the horizontal stabilizer is determined so that the power consumed by the main rotor is equal to a setpoint power. An optimized distribution of lift can thus be obtained in order to reduce the aerodynamic drag of the main rotor, and consequently increase its L/D ratio.

Finally, and in order to take account of the asymmetry in the angles of incidence between the two half-wings as generated by the main rotor, a lift difference between the half-wings is determined in order to compensate for this asymmetry in terms of angle of incidence.

In an implementation of the invention, display means of the aircraft displays information about the lift of the main rotor and a reference lift for the main rotor, together with information relating to the flaps of the two half-wings and information relating to the horizontal stabilizer.

In order to assist the pilot in optimizing the operation of the aircraft, the display means shows information that enables the pilot to adjust the lifts of the half-wings and of the horizontal stabilizer in optimum manner.

For this purpose, the actual lift of the main rotor is displayed, e.g. as obtained by measuring the forces in the support bars of the main gearbox, together with a setpoint lift that corresponds to the second predetermined percentage of the total lift of the aircraft.

Furthermore, in order to inform the pilot about the lift of the half-wings, a mean position of the flaps of the two half-wings is displayed, together with the position difference between those flaps. The mean position of the flaps corresponds to the identical position of the flaps of both half-wings that would enable the half-wing lift to be obtained. The position difference of these flaps then corresponds to the lift difference between the two half-wings, serving to compensate for the asymmetry in the angle of incidence between the two half-wings as generated by the main rotor.

Finally, a position of the movable surface (elevator) of the horizontal stabilizer is displayed, this position corresponding to the lift of the stabilizer.

The invention also provides a rotary wing aircraft having a high forward speed in a stabilized stage of flight and suitable for implementing the above-described control method.

Such an aircraft has a fuselage, at least one main rotor with a plurality of blades, at least one variable-pitch propulsive propeller, at least one lift-providing surface, and at least one power plant driving the main rotor and each propulsive propeller in rotation.

This lift-providing surface comprises at least two half-wings positioned on either side of the fuselage together with at least one aerodynamic control means for modifying the lift of the half-wings. In addition, this lift-providing surface includes at least one horizontal stabilizer positioned at one end of the aircraft and including at least one movable surface together with control means for operating the movable surface.

The aerodynamic control means of the aircraft enables the lift of the two half-wings to be adjusted so that this lift of the two half-wings is equal to the first predetermined percentage of the total lift of the aircraft during a stabilized stage of flight.

In an implementation of the invention, the control means for operating the movable surface of the stabilizer enables said movable surface to be operated and thus adjusts the lift of the horizontal stabilizer so that the power consumed by the main rotor is equal to a setpoint power during a stabilized stage of flight. This setpoint power corresponds to an optimum zone of operation, e.g. for the purpose of minimizing the power consumed by the main rotor, and consequently for minimizing fuel consumption.

In an embodiment of the invention, the aerodynamic control means of the aircraft comprise at least one movable flap on each half-wing and at least one control system for operating each flap. Each control system serves to operate the corresponding flap so as to adjust the lift of the corresponding half-wing.

In an embodiment of the invention, the aircraft has display means displaying information enabling the pilot to optimize the operation of the aircraft.

The display means displays the actual lift of the main rotor, e.g. as obtained by measuring forces in the support bars of the main gearbox, together with a setpoint lift that corresponds to the second predetermined percentage of the total lift of the aircraft.

Furthermore, in order to inform the pilot about the level of lift from the half-wings, the display means displays a mean position for the flaps of the two half-wings, together with a position difference between those flaps, thus corresponding to the lift difference between the two half-wings, thereby making it possible to compensate for the asymmetry in the angle of incidence between the two half-wings as generated by the main rotor.

Thereafter, the display means displays a position for the movable surface of the horizontal stabilizer corresponding to the lift of the stabilizer.

Finally, the display means displays a mode of operation that has been activated concerning the flaps and the horizontal stabilizer. The control system that operates the flaps of each of the half-wings may be controlled by an autopilot that is present on board the aircraft, or else by the pilot. The control system may possibly fail and consequently be inoperable. The display means then serve to inform the pilot about which mode has been activated or that the control system is inoperable. The same applies for the means for controlling the horizontal stabilizer.

BRIEF DESCRIPTION OF THE SEVERAL VIEWS OF THE DRAWINGS

The invention and its advantages appear in greater detail from the context of the following description of implementations given by way of illustration and with reference to the accompanying Figures, in which.

Elements that are shown in more than one of the figures are given the same references in each of them.

DETAILED DESCRIPTION OF THE INVENTION

Figure 1:
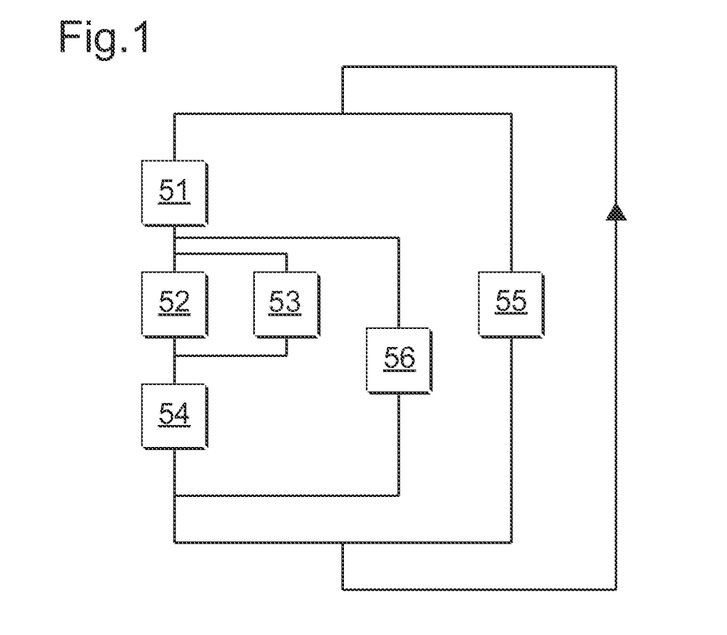
FIGS. 1 and 2 show two implementations of the method of the invention.
Figure 2:
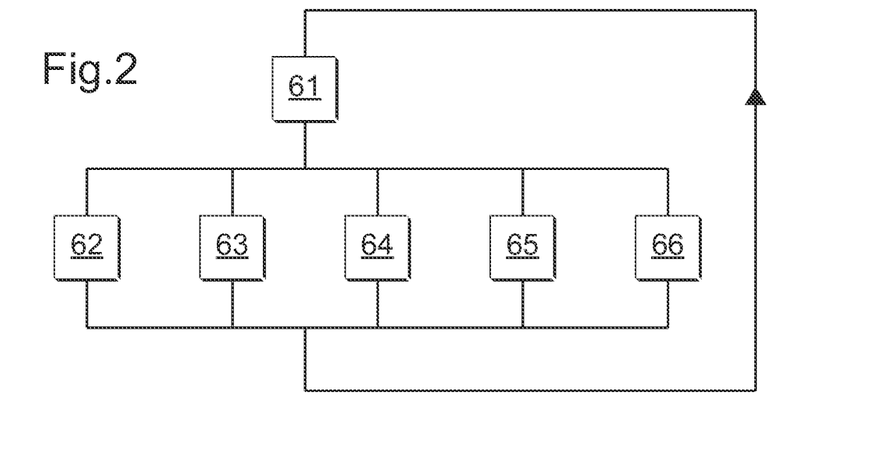
Figure 3:
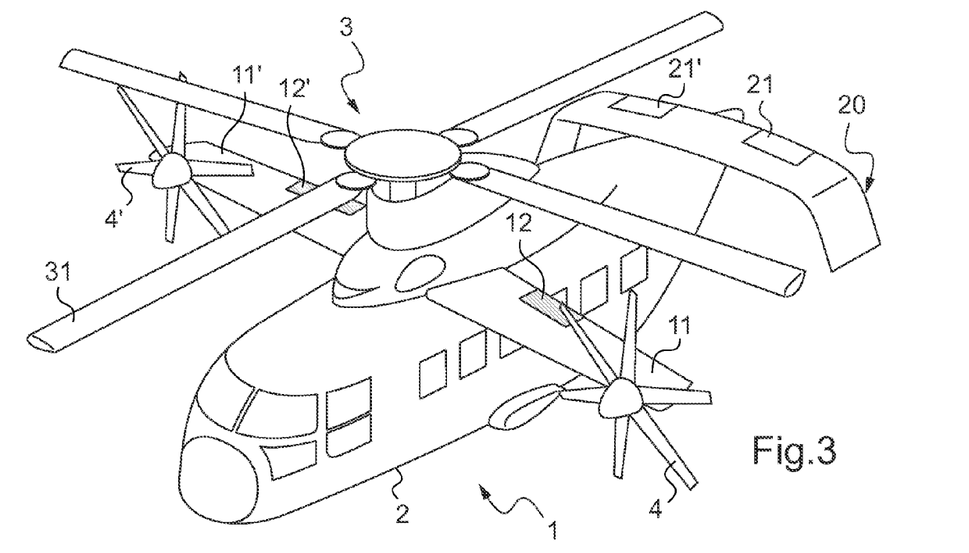
FIGS. 3 to 5 show an aircraft suitable for implementing the method of the invention.
Figure 4:
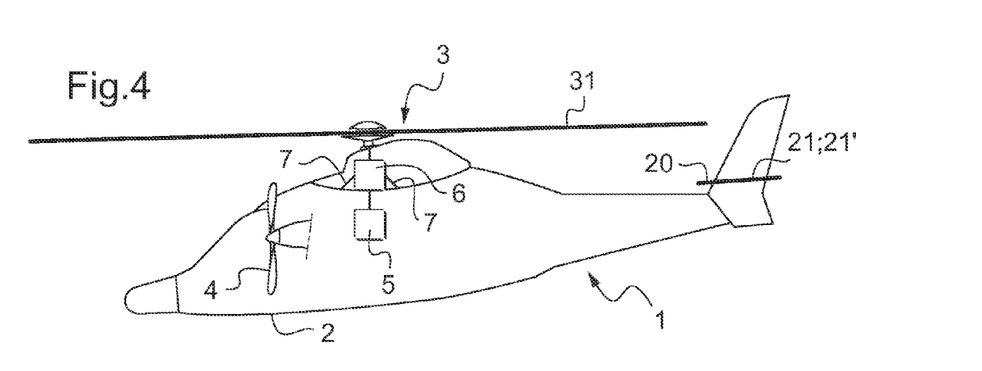
Figure 5:
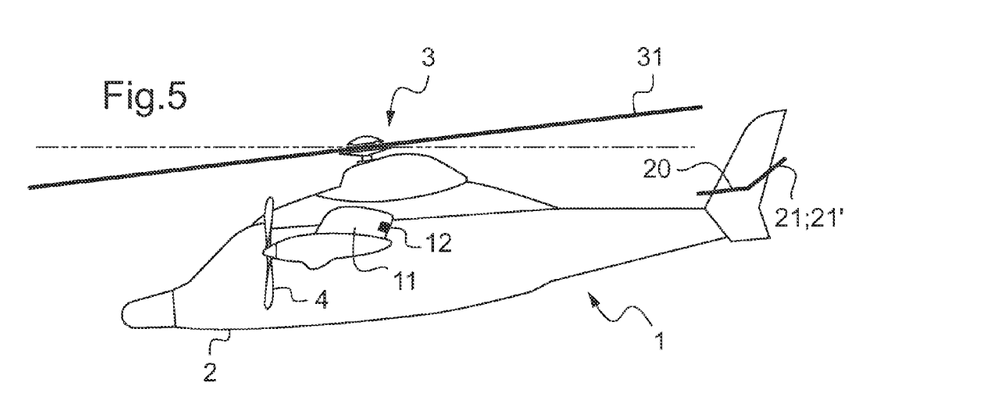

FIGS. 1 and 2 show two implementations of a method of controlling a high-speed rotary wing aircraft, which methods are made up of several steps. FIGS. 3 to 5 show a high-speed rotary wing aircraft suitable for performing the control method of the invention.

The method serves to adjust the lift of the half-wings 11, 11' and of the horizontal stabilizer 20 during a stabilized stage of flight of the aircraft 1. During such a stabilized stage of flight, the main flight parameters of the aircraft 1 are constant, and in particular its path and its angle of incidence and also its forward speed. Furthermore, the method is activated on the aircraft only when the roll angle of the aircraft 1 is less than 10° and the forward speed of the aircraft 1 is greater than 50 kts, with no action being taken by a pilot on the controls of the aircraft 1.

Such an aircraft, as shown in FIGS. 3 and 4, has a fuselage 2, a main rotor 3 with a plurality of blades 31, two variable-pitch propulsive propellers 4 and 4', two half-wings 11 and 11' positioned on either side of the fuselage 2, a horizontal stabilizer 20 positioned at the rear end of the aircraft 1, and a power plant 5 that drives the main rotor 3 and the propulsive propellers 4, 4' in rotation. The power plant 5 is in particular connected to the main rotor 3 via a main power gearbox 6 that is secured to the fuselage 2 of the aircraft by a plurality of support bars 7.

The half-wings 11 and 11' include respective aerodynamic control means for adjusting the lift of each half-wing 11, 11'. These aerodynamic control means comprise respective flaps 12, 12' on each of the half-wings 11, 11' together with systems for operating the flaps 12, 12'. The horizontal stabilizer 20 has two movable surfaces 21, 21' that can be operated by control means for controlling the movable surfaces 21, 21'. Operating each of the flaps 12, 12' and operating the movable surfaces 21, 21' gives rise to an adjustment in the lift respectively of each half-wing 11, 11' and of the horizontal stabilizer 20.

The control method shown in FIG. 1 comprises six steps.

Step 51 consists in determining the total lift of the aircraft 1. This total lift exactly balances the weight of the aircraft 1 so as to support the aircraft 1 at constant altitude. The weight is defined on the basis of the weight of the aircraft 1 and of the weight of fuel it has consumed, which may be determined for example by measuring the fuel consumption of the power plant 5 via flow meters installed on the power plant 5.

A step 52 consists in determining the lift of the two half-wings 11, 11' using the following formula:

$$Z_{wing} = \frac{1}{2} \times \rho \times TAS^2 \times S \times \overline{C}_z$$

where $\rho$ is the density of the air in the conditions of flight, TAS is the forward speed of the aircraft 1, S is the surface area of the two half-wings 11, 11', $\overline{C}_z$ is the mean lift coefficient of the half-wings 11, 11' for an angle of incidence:

$$\alpha = \alpha_{fus} + \alpha_{interaction}$$

where $\alpha_{fus}$ is the angle of incidence of the aircraft 1 and $\alpha_{interaction}$ is a correction for the angle of incidence, e.g. determined by flight tests.

The following formula is also known for giving the angle of incidence of the aircraft 1:

$$\alpha_{fus} = \theta - \text{Arcsin}(Vz/TAS)$$

where $\theta$ is the longitudinal attitude of the aircraft 1 and $V_z$ is the vertical speed of the air relative to the aircraft 1.

The values of this longitudinal attitude and of the forward speed of the aircraft 1 and of the vertical speed of the air are obtained by means of sensors present in the aircraft 1. Likewise, the density of the air corresponds to standard atmospheric conditions at the flying altitude.

In a preferred implementation of step 52, a step 52' consists in determining the lift of the main rotor 3 by measuring forces present in the support bars 7, these forces being proportional to the lift of the main rotor 3.

Simultaneously with step 52, a step 53 consists in determining a difference in lift between the half-wings 11, 11' in order to compensate for the effects of the main rotor 3 on each of the half-wings 11, 11'. The air streams generated by the rotation of the main rotor 3 affect the two half-wings 11, 11' located on either side of the fuselage 2 of the aircraft 1 in different ways, thereby creating asymmetry in the angles of incidence of the two half-wings 11, 11'. A difference in lift appears between the half-wings 11, 11' and tends to cause the aircraft 1 to roll.

Step 53 consists in determining the difference in lift between the half-wings 11, 11' in order to compensate this difference in lift so as to avoid making the aircraft 1 roll.

During a step 54, the lift of the half-wings 11, 11' is adjusted so as to be equal to a first predetermined percentage of the total lift of the aircraft 1. This first predetermined percentage corresponds to a good share of lift between the main rotor 3 and the half-wings 11, 11' so as to enable such an aircraft to operate well. This first predetermined percentage is preferably equal to 40%.

Nevertheless, in the step 52', since the total lift of the aircraft 1 is equal to the sum of the lift from the main rotor 3 plus the lift from the two half-wings 11, 11', it is deduced therefrom that the lift of the main rotor 3 must be equal to a second predetermined percentage of the total lift of the aircraft 1, with the sum of the first predetermined percentage plus the second predetermined percentage being equal to 100%. For example, if the first predetermined percentage is 40%, then the second predetermined percentage is 60%. During this step 54, the lift of the half-wings 11, 11' is thus adjusted so that the lift of the main rotor 3 as determined during the step 51 is equal to a second predetermined percentage of the total lift of the aircraft 1.

Simultaneously with the steps 51 to 54, a step 55 consists in adjusting the lift of the horizontal stabilizer 20 so that the power consumed by the main rotor 3 is equal to a setpoint power, this setpoint power preferably lying in the range 20% to 40% of the power consumed by the main rotor 3 while the aircraft 1 is in hovering flight.

As shown in FIG. 5, varying the lift of the stabilizer 20 by moving the movable surfaces 21, 21' modifies the angle of inclination of the main rotor 3 while the aircraft 1 is in a stage of stabilized flight. Depending on this angle of inclination, the main rotor 3 may be nose-down, as shown in FIG. 5, or nose-up, in terms of pitching moment, with the collective and cyclic pitches of the blades 31 of the main rotor 3 being modified so as to keep the parameters of the stabilized stage of flight constant. Consequently, an adjustment of the lift of the stabilizer 20 leads to a modification in power consumption by the main rotor 3. It is thus possible to adjust the lift of the stabilizer 20 so that the power consumed by the main rotor 3 is equal to a setpoint power. The power consumed by the main rotor 3 may for example be measured by means of a torque meter and conventional means for supplying the rotation frequency of the main rotor 3.

In a variant of this step 55, the setpoint power corresponds to a pair of setpoint values, one for cyclic pitch and the other for collective pitch. The lift of the stabilizer 20 is then adjusted so that the cyclic pitch and the collective pitch of the blades 31 of the main rotor 3 of the aircraft 1 are equal to said pair of setpoint values.

In another variant of this step 55, the lift of the horizontal stabilizer 20 is adjusted so that the longitudinal bending moment of a mast of the main rotor 3 is equal to a setpoint longitudinal bending moment. It is possible to measure the bending moment of the mast of the main rotor 3, in particular in an aircraft 1 having a rigid hub. Thereafter, any modification to the lift of the stabilizer 20 modifies the angle of inclination of the main rotor 3 and consequently acts on the bending of the mast of the main rotor 3. As a result, by adjusting the lift of the stabilizer 20, it is possible to make the longitudinal bending moment of the mast of the main rotor 3 equal to a setpoint longitudinal bending moment so that the bending moment is small or even zero, thereby limiting the stresses on the mast.

Finally, a step 56, performed simultaneously with the steps 52 to 54, consists in displaying information on display means (shown in FIG. 6), the information comprises information 33 relating to the lift of the main rotor 3, information 34 relating to a setpoint lift for the main rotor 3, information 15, 16, 17, and 18 relating to the flaps 12 and 12' of the two half-wings 11 and 11', and information 25 and 26 relating to the horizontal stabilizer 20. All this information is known, with the lift of the main rotor 3 being determined from measurements of the forces in the support bars 7 of the main gearbox 6. In addition, the setpoint lift for the main rotor 30 is equal to a second predetermined percentage of the total lift of the aircraft 1.

Figure 6:
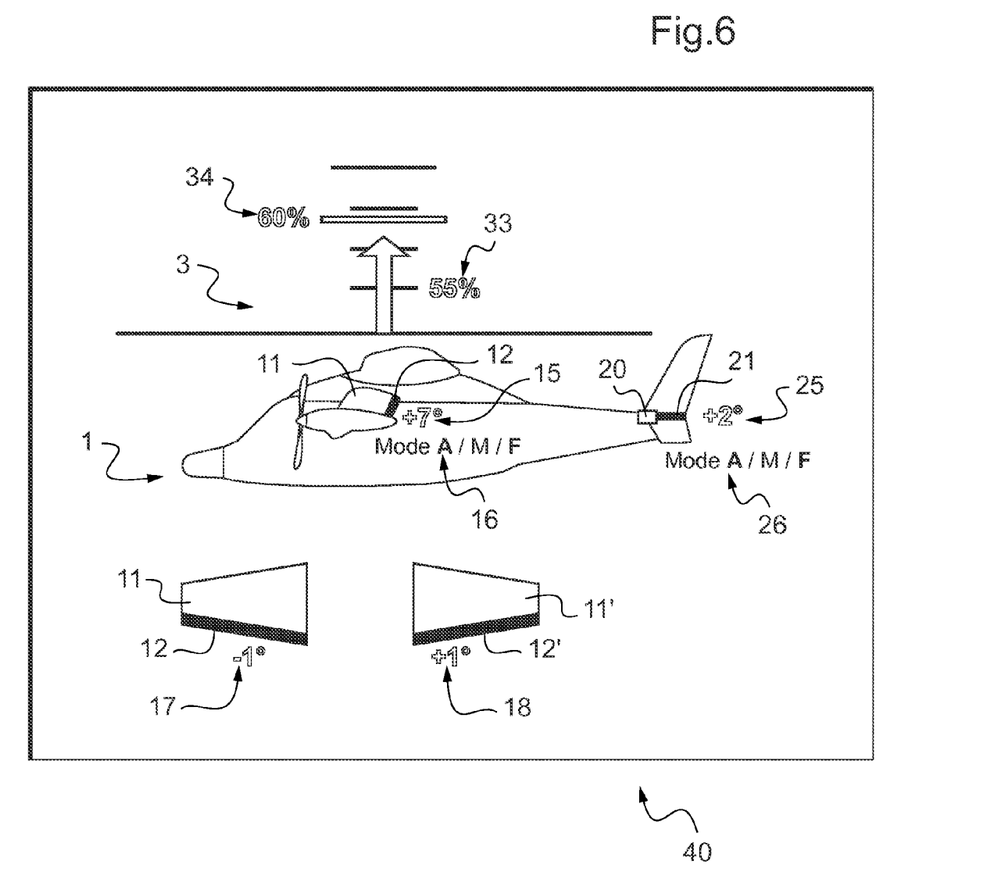
FIG. 6 shows display means of the aircraft.

The display means 40 also displays an operating mode 16 activated on the flaps 12, 12' and on the horizontal stabilizer 20. The control system that operates the flaps 12 and 12' may be controlled by an autopilot that is present on board the aircraft 1 or else manually by the pilot. This control system may also have failed and consequently not be in operation. Under such circumstances, the display means 40 displays information 16 concerning the flaps 12 and 12' in the form of a message "Mode A" when the autopilot is engaged, "Mode M" when the flaps 12 and 12' are manually controlled, and "Mode F" when the control system has failed. The same applies for the control means of the horizontal stabilizer 20.

This information thus enables the pilot to optimize the operation of the aircraft 1.

The method of the invention shown in FIG. 2 has seven steps. A step 61 consists in determining the total lift of the aircraft 1.

Thereafter, a cyclic pitch value and a collective pitch value are determined simultaneously for the blades 31 of the main rotor 3 together with the lift of the horizontal stabilizer 20 and the lift of the half-wings 11, 11' for a stabilized stage of flight.

A step 62 consists in determining a collective pitch value for the blades 31 of the main rotor 3 so that the angle of incidence of the aircraft 1 is equal to a setpoint angle of incidence. A step 63 consists in determining a longitudinal cyclic pitch value for the blades 31 of the main rotor 3 so that the longitudinal attitude of the aircraft 1 is equal to a setpoint longitudinal attitude.

A step 64 consists in determining a lateral cyclic pitch value for the blades 31 of the main rotor 3 so that a lateral attitude of the aircraft 1 is equal to a setpoint lateral attitude.

A step 65 consists in determining the lift of the half-wings 11, 11' so that it corresponds to the first predetermined percentage of the total lift of the aircraft 1, and the lift of the horizontal stabilizer 20 so that the power consumed by the main rotor 3 is equal to a setpoint power.

A step 66 consists in determining a lift difference between the half-wings 11, 11' so as to take account of the asymmetry in angle of incidence between the two half-wings 11, 11' as generated by the main rotor 3.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

For example, the adjustment of the lift of the two half-wings 11, 11' as performed in the implementation described by the aerodynamic control means constituted by the flaps 12, 12' and the control systems, could be obtained by a rotary movement of each half-wing 11, 11' as a whole, the half-wings 11, 11' then not including flaps 12, 12'. Such an adjustment may also be obtained with half-wings 11, 11' that do not have flaps 12, 12' and that are stationary relative to the fuselage 2 of the aircraft 1, and by changing the attitude of the aircraft 1.

Likewise, the adjustment of the lift of the horizontal stabilizer 20, performed in the implementations described by two movable surfaces 21 and 21' together with control means, could be performed by the horizontal stabilizer 20 being movable as a whole.

What is claimed is:

1. A method of controlling a high-speed rotary wing aircraft, the aircraft comprising:
   a fuselage;
   at least one main rotor having a plurality of blades;
   at least one variable-pitch propulsive propeller;
   at least two half-wings positioned on either side of said fuselage;
   aerodynamic control means of said aircraft comprising at least one movable flap on each half-wing, and at least one system for operating said flaps;
   at least one horizontal stabilizer positioned at one end of said aircraft, said horizontal stabilizer having at least one movable surface; and
   at least one power plant driving said main rotor and each propulsive propeller in rotation;
   the method comprising the following steps:
   determining the total lift of the aircraft assuming that said total lift counters the weight of said aircraft; and
   adjusting the lift of each half-wing by acting on said system for controlling said flaps so that (i) said lift of said half-wings is equal to a first predetermined percentage of said total lift of said aircraft during a stage of stabilized flight and (ii) the lift of each half-wing is different such that a difference in lift is between two half-wings, the difference in lift between said two half-wings serving to compensate for the effects of said main rotor affecting said half-wings differently.

2. A method according to claim 1, wherein said lift of said half-wings is equal to 40% of said total lift of said aircraft.

3. A method according to claim 1, wherein said weight of said aircraft is determined from the fuel consumption of said power plant.

4. A method according to claim 1, wherein said lift of said half-wings is determined with the help of the following relationship:

$$Z_{wing} = \tfrac{1}{2} \times \rho \times TAS^2 \times S \times \overline{C}_z$$

where:
   "$Z_{wing}$" represents said lift of said two half-wings;
   "$\rho$" represents the density of the air under the conditions of flight;
   "TAS" represents the forward speed of said aircraft;
   "S" represents the total surface area of the two half-wings;
   "$\overline{C}_z$" represents the mean lift coefficient of said two half-wings, which coefficient is a function of the aerodynamic angle of incidence $\alpha$ of said half-wings, where:

$$\alpha = \alpha_{fus} + \alpha_{interaction}$$

"$\alpha_{fus}$" represents the aerodynamic angle of incidence of said aircraft and is determined by:

$$\alpha_{fus} = \theta - \mathrm{Arcsin}(Vz/TAS)$$

"$\alpha_{interaction}$" represents an angle of incidence correction of said half-wings;
   "Vz" represents the vertical speed of the air relative to said aircraft;
   "$\theta$" represents the longitudinal attitude of said aircraft; and
   "$\times$" represents the multiplication sign;
   and then said lift of said half-wings is adjusted so that said lift of said half-wings is equal to said first predetermined percentage of said total lift of the aircraft.

5. A method according to claim 1, wherein said main rotor is driven by a main gearbox connected to said fuselage by a plurality of support bars, forces in said support bars are measured, and the lift of said main rotor is determined from the measurements of said forces in said support bars, after which the lift of said half-wings is adjusted so that said lift of said main rotor is equal to a second predetermined percentage of said total lift of the aircraft, the sum of said first predetermined percentage plus said second predetermined percentage being equal to 100%.

6. A method according to claim 1, wherein said lift of said half-wings is adjusted when:
   the roll angle of said aircraft is less than 10%;
   the forward air speed TAS of said aircraft is greater than 50 kts; and
   no action is detected on the controls of said aircraft.

7. A method according to claim 1, wherein said lift difference between said two half-wings is determined in order to compensate for said effects of said main rotor on said half-wings.

8. A method according to claim 1, wherein a setpoint lateral cyclic pitch is determined so that said lift difference between said two half-wings enables a lateral cyclic pitch of said blades of said main rotor to be equal to said setpoint lateral cyclic pitch.

9. A method according to claim 1, wherein a setpoint lateral bending moment of a mast of a said main rotor is determined so that said lift difference between said half-wings enables a lateral bending moment of said mast of said main rotor to be equal to said setpoint lateral bending moment of said mast of said main rotor.

10. A method according to claim 1, wherein the lift of said horizontal stabilizer is adjusted by acting on control means for each movable surface so that a longitudinal cyclic pitch of said blades of said main rotor is equal to a setpoint longitudinal cyclic pitch.

11. A method according to claim 1, wherein the lift of said horizontal stabilizer is adjusted by acting on control means for each movable surface so that the power consumed by said main rotor is equal to a setpoint power during said stabilized stage of flight.

12. A method according to claim 11, wherein said setpoint power consumed by said main rotor during a stabilized stage of flight corresponds to a value lying in the range 20% to 40% of the power consumed by said main rotor during hovering flight of said aircraft.

13. A method according to claim 1, wherein the lift of said horizontal stabilizer is adjusted by acting on control means for each movable surface so that the longitudinal bending moment of a mast of said main rotor is equal to a setpoint longitudinal bending moment during said stage of stabilized flight.

14. A method according to claim 1, wherein the following are determined simultaneously:
   the longitudinal cyclic pitch of said blades of said main rotor in order to ensure the longitudinal attitude of said aircraft is equal to a setpoint longitudinal attitude;
   the collective pitch of said blades of said main rotor in order to ensure that the altitude of said aircraft is equal to a setpoint altitude;
   the lateral cyclic pitch of said blades of said main rotor in order to ensure that the lateral attitude of said aircraft is equal to a setpoint lateral attitude;
   the lift of said horizontal stabilizer in order to ensure that the power consumed by said main rotor is equal to a target power;
   the lift of said half-wings corresponding to said first predetermined percentage of said total lift of said aircraft; and the difference in lift between the half-wings in order to compensate for the angle of incidence asymmetry generated by said main rotor between said half-wings.

15. A method according to claim 1, wherein information is displayed on display means of said aircraft, the information relating to said lift of said main rotor, to said setpoint lift for said main rotor, to said flaps, and to said horizontal stabilizer.

16. A high-speed rotary wing aircraft comprising:
a fuselage;
at least one main rotor having a plurality of blades;
at least one variable-pitch propulsive propeller;
at least one horizontal stabilizer positioned at one end of said aircraft and including at least one movable surface;
at least two half-wings positioned on either side of said fuselage, aerodynamic control means for modifying the lift of said two half-wings, said aerodynamic control means comprising at least one movable flap on each half-wing and at least one control system for operating said flaps; and
at least one power plant driving said main rotor and said propulsive propeller;
wherein said control system enables each flap to be operated so as to adjust the lift of said half-wings in order to ensure that (i) said lift of said half-wings is equal to a first predetermined percentage of the total lift of said aircraft during a stage of stabilized flight and (ii) the lift of each half-wing is different such that a difference in lift is between two half-wings, with the difference in lift between said two half-wings serving to compensate for the effects of said main rotor affecting said half-wings differently.

17. An aircraft according to claim 16, wherein said control means for operating said movable surface makes it possible to adjust the lift of said horizontal stabilizer in order to ensure that the power consumed by said main rotor is equal to a setpoint power.

18. An aircraft according to claim 16, including display means that display:
information relating to said lift of said main rotor and to a setpoint lift for said main rotor corresponding to a second predetermined percentage of said total lift of the aircraft, the sum of said first predetermined percentage plus said second predetermined percentage being equal to 100%;
information relating to said flaps;
a mode of operation activated for said flaps;
information relating to said horizontal stabilizer; and
a mode of operation activated for said horizontal stabilizer.

19. A method according to claim 1, wherein the following are determined simultaneously:
the longitudinal cyclic pitch of said blades of said main rotor in order to ensure the longitudinal attitude of said aircraft is equal to a setpoint longitudinal attitude;
the collective pitch of said blades of said main rotor in order to ensure that the angle of incidence of said aircraft is equal to a setpoint angle of incidence;
the lateral cyclic pitch of said blades of said main rotor in order to ensure that the lateral attitude of said aircraft is equal to a setpoint lateral attitude;
the lift of said horizontal stabilizer in order to ensure that the power consumed by said main rotor is equal to a target power;
the lift of said half-wings corresponding to said first predetermined percentage of said total lift of said aircraft; and
the difference in lift between the half-wings in order to compensate for the angle of incidence asymmetry generated by said main rotor between said half-wings.

20. A method of controlling a high-speed rotary wing aircraft, the aircraft comprising:
a fuselage;
at least one main rotor having a plurality of blades;
at least one variable-pitch propulsive propeller;
at least two half-wings positioned on either side of said fuselage;
aerodynamic control means of said aircraft comprising at least one movable flap on each half-wing, and at least one system for operating said flaps;
at least one horizontal stabilizer positioned at one end of said aircraft, said horizontal stabilizer having at least one movable surface; and
at least one power plant driving said main rotor and each propulsive propeller in rotation;
the method comprising the following steps:
determining the total lift of the aircraft assuming that said total lift counters the weight of said aircraft; and
adjusting the lift of each half-wing by acting on said system for controlling said flaps so that said lift of said half-wings is equal to a first predetermined percentage of said total lift of said aircraft during a stage of stabilized flight, a difference in lift between said two half-wings serving to compensate for the effects of said main rotor on said half-wings;
wherein said main rotor is driven by a main gearbox connected to said fuselage by a plurality of support bars, forces in said support bars are measured, and the lift of said main rotor is determined from the measurements of said forces in said support bars, after which the lift of said half-wings is adjusted so that said lift of said main rotor is equal to a second predetermined percentage of said total lift of the aircraft, the sum of said first predetermined percentage plus said second predetermined percentage being equal to 100%.

* * * * *